(12) United States Patent
Xiao

(10) Patent No.: US 9,033,356 B2
(45) Date of Patent: May 19, 2015

(54) SHILLY-CAR

(71) Applicant: Kunshan Jian Xiang Wei Mechanical Technology Co., LTD., Kunshan, Jiangsu Province (CN)

(72) Inventor: Jian-Wei Xiao, Kunshan (CN)

(73) Assignee: KUNSHAN JIAN XIANG WEI MECHANICAL TECHNOLOGY CO., LTD., Kunshan, Jiangsu Pronvince (CN)

( * ) Notice: Subject to any disclaimer, the term of this patent is extended or adjusted under 35 U.S.C. 154(b) by 0 days.

(21) Appl. No.: 14/133,817

(22) Filed: Dec. 19, 2013

(65) Prior Publication Data

US 2014/0339786 A1   Nov. 20, 2014

(30) Foreign Application Priority Data

May 16, 2013 (CN) ............... 2013 1 0182875
May 16, 2013 (CN) ............... 2013 2 0269187 U
May 21, 2013 (CN) ............... 2013 1 0190015
May 21, 2013 (CN) ............... 2013 2 0280675 U

(51) Int. Cl.
*B62M 1/24* (2013.01)
*B62K 5/02* (2013.01)
*B62K 15/00* (2006.01)

(52) U.S. Cl.
CPC .. *B62M 1/24* (2013.01); *B62K 5/02* (2013.01); *B62K 15/00* (2013.01)

(58) Field of Classification Search
CPC ............ B62M 1/12; B62M 1/14; B62M 1/16; B62M 1/24; B62K 5/02

USPC ........ 280/62, 253, 265, 266, 87.01, 210, 218, 280/242.1, 244, 263, 288.1, 79.2

See application file for complete search history.

(56) References Cited

U.S. PATENT DOCUMENTS

| | | | | |
|---|---|---|---|---|
| 1,636,172 A | * | 7/1927 | Coates | 280/62 |
| 2,092,683 A | * | 9/1937 | Stidham | 280/443 |
| 3,059,943 A | * | 10/1962 | Rich | 280/87.021 |
| 3,430,975 A | * | 3/1969 | Wolf | 280/103 |
| 3,663,038 A | * | 5/1972 | Hendricks | 280/218 |
| 4,200,304 A | * | 4/1980 | Hwang | 280/218 |
| 4,230,331 A | * | 10/1980 | Johnson | 280/218 |

(Continued)

FOREIGN PATENT DOCUMENTS

| | | | |
|---|---|---|---|
| CN | 201179937 | * | 1/2009 |
| CN | 202147807 | * | 2/2012 |

(Continued)

*Primary Examiner* — Tony H. Winner
*Assistant Examiner* — Maurice Williams
(74) *Attorney, Agent, or Firm* — Jackson IPG PLLC; Demian K. Jackson

(57) ABSTRACT

A shilly-car includes a main frame module with a rear-wheel tube and a main-frame tube, a front connecting tube and a swing module. A seat cushion is mounted onto a T-shaped structure comprised of the rear-wheel tube and main-frame tube, and two wheels are installed at both ends of the rear-wheel tube respectively. The swing module includes a pedal tube and a swing tube having a bearing sleeve and a bearing. The front connecting tube has an end rotably fixed to the swing tube and the other end fixed with the main-frame tube, and a C-shaped fixed element is installed at an end of the front connecting tube for receiving the bearing sleeve and the bearings, and a fixing shaft is provided for rotably fixing both bearing sleeve and bearing, so that the pedal tube can be stepped by both legs of a rider to move the shilly-car forward.

10 Claims, 4 Drawing Sheets

(56) References Cited

U.S. PATENT DOCUMENTS

| | | | |
|---|---|---|---|
| 4,281,844 A * | 8/1981 | Jackman et al. | 280/87.01 |
| 4,359,231 A * | 11/1982 | Mulcahy | 280/87.01 |
| 4,930,796 A * | 6/1990 | Harrod | 280/87.021 |
| 5,536,029 A * | 7/1996 | Gramckow | 280/263 |
| 6,361,058 B1 * | 3/2002 | Yuan | 280/242.1 |
| 6,561,534 B2 * | 5/2003 | Gu | 280/242.1 |
| 6,581,947 B2 * | 6/2003 | Andrews et al. | 280/266 |
| 7,445,225 B2 * | 11/2008 | Volk | 280/282 |
| 7,552,934 B2 * | 6/2009 | Lee et al. | 280/266 |
| 8,562,004 B2 * | 10/2013 | Stillinger et al. | 280/87.021 |
| D706,876 S * | 6/2014 | Grout | D21/426 |
| 8,820,460 B2 * | 9/2014 | Chen et al. | 180/210 |
| 2001/0042968 A1 * | 11/2001 | Andrews et al. | 280/220 |
| 2002/0113404 A1 * | 8/2002 | Yang | 280/293 |
| 2004/0239063 A1 * | 12/2004 | Dermigny | 280/87.01 |
| 2005/0236800 A1 * | 10/2005 | Lai | 280/218 |
| 2006/0079152 A1 * | 4/2006 | Suimon et al. | 446/460 |
| 2007/0235975 A1 * | 10/2007 | Lee et al. | 280/266 |
| 2008/0179849 A1 * | 7/2008 | Fan | 280/87.041 |
| 2009/0020983 A1 * | 1/2009 | Broemeling | 280/476.1 |
| 2011/0042912 A1 * | 2/2011 | Kermani | 280/62 |

FOREIGN PATENT DOCUMENTS

| | | | | |
|---|---|---|---|---|
| CN | 202896778 | * | 4/2013 | B62K 9/02 |
| WO | WO 2014040273 | * | 3/2014 | B62K 9/02 |

* cited by examiner

SHILLY-CAR

FIELD OF THE INVENTION

The present invention relates to a children's toy car, in particular to a shilly-car that can be controlled to swing and move forward without requiring both hands.

BACKGROUND OF THE INVENTION

At present, a shilly-car becomes one of the popular children's toy cars since its safety and practicality catch much attention, and related manufactures keep improving the shilly-car further.

A shilly-car as disclosed in P.R.C. Pat. No. 200720196751.0 was published on Jan. 14, 2009 comprises a wheel swing module, a connecting element, a rotating element and a seat frame, wherein the swing module includes a front wheel, and a rear wheel mounted on the seat frame, wherein the wheel swing module is coupled to an end of a connecting element through a rotating element in order to control the steering direction of the leg-controlled wheel swing module by legs, and the other end of the connecting element is coupled to the seat frame. When the foregoing structured shilly-car is used, the user sits on the seat frame and put both legs on the leg-controlled wheel swing module. After motive forces are applied to the shilly-car, a rotating element installed on the connecting element is provided for the user to rotate the leg-controlled swing module to swing and move the shilly-car forward. The user sits on the leg-controlled shilly-car and shifts the center of gravity of the human body backward, so that the user's legs can be comfortably spread to operate the leg-controlled wheel swing module and improve the comfort of use.

As disclosed in P.R.C Pat. No. 201120266572.6 entitled "Improved shilly-car structure" and published on Feb. 22, 2012, the shilly-car structure comprises a leg-controlled wheel swing module, a link rod and a seat frame, wherein the leg-controlled wheel swing module includes a handlebar, a bushing, a front wheel shaft and a front wheel, and the handlebar and the front wheel shaft is connected by the sleeve, and a bearing is installed in the bushing, and the front wheel is installed onto the front wheel shaft, and an end of the link rod is connected to the seat frame, and the other end of the rod has a bushing shaft with an upper end inserted from the top end of the bushing and passed through the bearing in the bushing, and a screw is inserted from the bottom end of the bushing and coupled to a threaded hole at the bottom of the bushing shaft, so that the leg-controlled wheel swing module an the link rod constitute a swing motion, and such shilly-car has the bushing installed at the connecting position between the handlebar and the front wheel shaft, and the bushing shaft is installed at an end of the link rod, so that if the bushing is damaged, it is necessary to replace a section of the link rod only without the need of replacing the whole leg-controlled wheel swing module. In addition, the bushing is installed at the connecting position between the handlebar and the front wheel shaft, the overall strength of the leg-controlled wheel swing module can be improved, and the whole structure becomes simple and reasonable.

However, the aforementioned two types of shilly-cars still have the following drawbacks:

1. The metal frame causes a heavy weight of the shilly-cars, so that it is difficult for children to use the shilly-cars and for the children's parents to move.

2. The seat cushion made of canvas and the backrest made of iron tubes cause back pains to riders and affect the children's growth and development.

3. The brake device is insensitive and easy to cause smashed fingers.

4. There is a hidden danger of making a turn with a too-large radius or causing unexpected turning, shifting or falling after making a turn.

SUMMARY OF THE INVENTION

In view of the aforementioned drawbacks of the conventional shilly car, it is a primary objective of the present invention to overcome the drawbacks of the prior art by providing a shilly-car with a simple and reliable structure, a flexible operation, and a comfort seat.

To achieve the aforementioned objective, the present invention provides a shilly-car comprising a main frame module, a front connecting tube, and a swing module sequentially coupled to one another, characterized in that the main frame module includes a rear-wheel tube and has an end fixed to a main-frame tube at the middle of the rear-wheel tube, and the rear-wheel tube and the main-frame tube form a T-shaped structure installed with a seat cushion, and two moving wheels are installed at both ends of the rear-wheel tube respectively; the swing module includes a pedal tube and a swing tube, and an end of the swing tube is fixed to the middle of the pedal tube and the other end of the swing tube is installed with a guide wheel, and the swing tube has a bearing sleeve and a bearing installed separately at both ends of the bearing sleeve; the front connecting tube has an end rotably fixed to the swing tube and the other end fixed and coupled to a corresponding end of the main-frame tube, and an end of the front connecting tube has a C-shaped fixed element for containing the bearing sleeve and the bearings at both ends of the bearing sleeve, and further has a fixing shaft capable of rotably fixing the bearing sleeve and the bearings at both ends of the bearing sleeve into the fixed element.

Therefore, the center of gravity and both hands of a rider are situated on the seat cushion, and the user can pedal the pedal tube by both legs to move the shilly-car to move forward. The shilly-car not just complies with the ergonomic requirements, but also provides better riding effect and safety.

The present invention has the following advantages and effects: The T-shaped structured main frame module of the shilly-car can achieve the effects of saving steel material, reducing the total weight, providing better security and safety, and saving costs. The ergonomic backrest cushion makes sure that the children's development and growth will not be affected adversely, and the ergonomic design also gives the comfortable and safety features.

In addition, the moving wheels with the movement restoring mechanism allows the rear wheel to restore its original position after making a turn, so as to maintain a linear forward movement without any unexpected turning or shifting, and improve the safety of riding. The overall structure has taken the user's safety into consideration and comes with a reasonable design to minimize the production cost and benefit consumers. The brake device adopts a semi-concealed cable handbrake with a sensitive braking capability and the user's hands or fingers will not be pinched easily, so as to further improve the safety.

DESCRIPTION OF THE PREFERRED EMBODIMENTS

The present invention will become clearer in light of the following detailed description of an illustrative embodiment of this invention described in connection with the drawings. It is intended that the embodiments and drawings disclosed herein are to be considered illustrative rather than restrictive.

Figure 1:
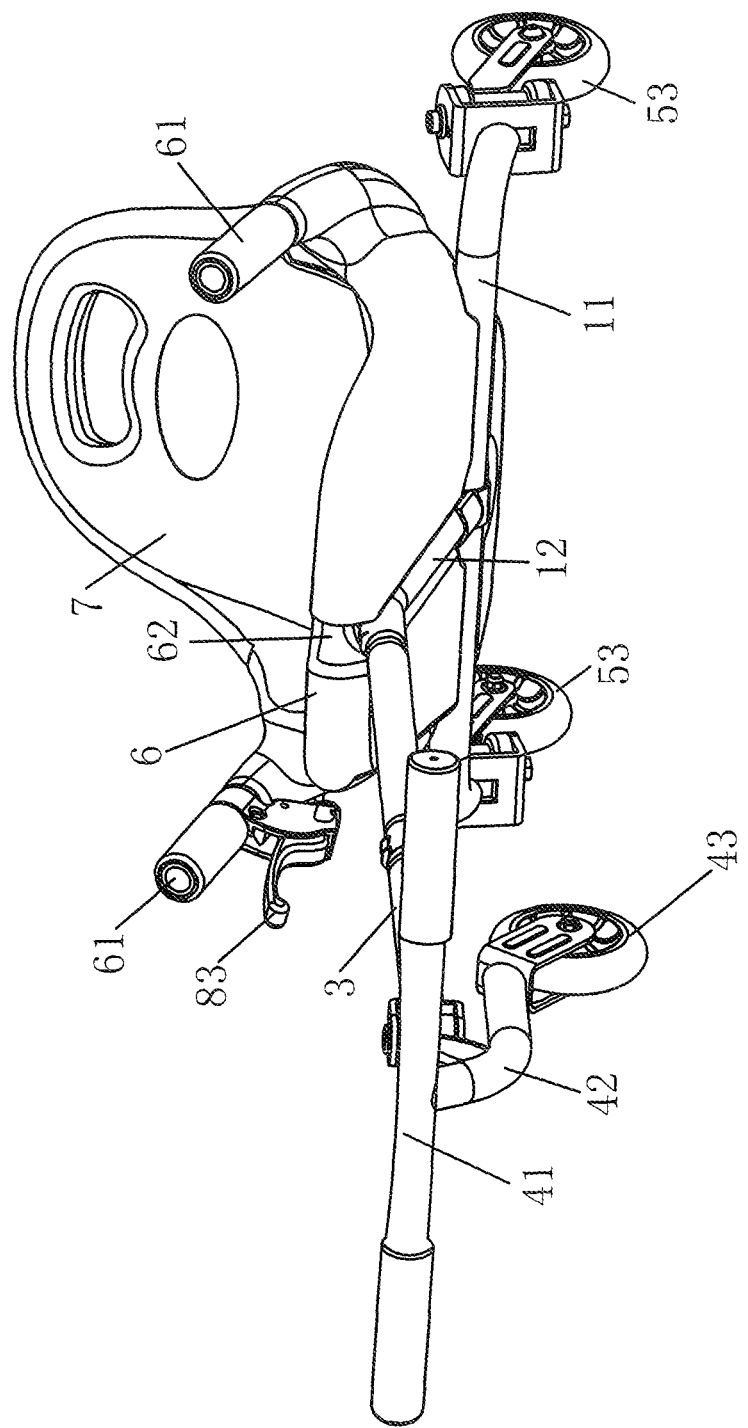
FIG. 1 is a perspective view of a shilly car of the present invention.
Figure 2:
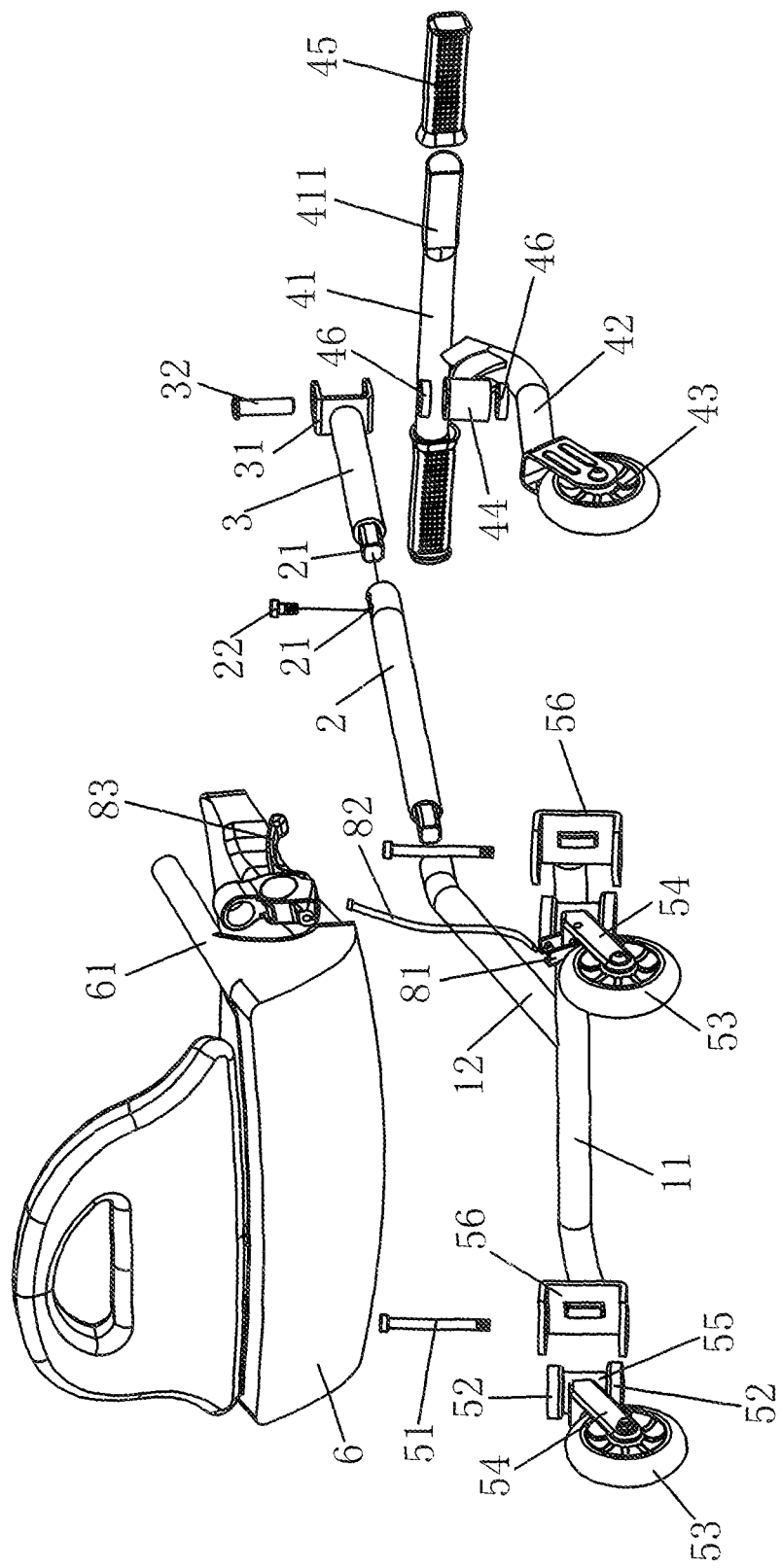
FIG. 2 is an exploded view of a shilly car of the present invention.

With reference to FIGS. 1 and 2 for a shilly-car of the present invention, the shilly-car comprises a main frame module, a front connecting tube 3 and a swing module sequentially coupled to one another, and the main frame module includes a rear-wheel tube 11 with two moving wheels 53 installed at both ends of the rear wheel tube 11 respectively, and an end is fixed to the main-frame tube 12 at the middle of the rear-wheel tube 11, and a T-shaped structure formed by the rear-wheel tube 11 and the main-frame tube 12 includes a seat cushion 6 and a backrest cushion 7, a T-shaped installing groove 62 corresponding to the T-shaped structure on the main frame module is formed at the bottom of the seat cushion 6 for facilitating the installation and fixation of the seat cushion 6 onto the main frame module, and both sides of the seat cushion 6 have an armrest 61 separately, and the backrest cushion 7 and the seat cushion 6 are formed by blow molding according to an ergonomic design to reduce the weight and provide a convenient application. The shilly-car further includes a polyurethane (PU) anti-scratch safe pad to prevent causing back pains to children or affecting the children's development and growth. Two installation rods are extended from the bottom of the backrest cushion 7 and inserted into the installing holes formed on the seat cushion 6 to facilitate users to install or remove the backrest cushion 7 and the seat cushion 6 anytime, wherein the seat cushion 6 and the backrest cushion 7 can be integrally formed, and the main frame module is a T-shaped structure comprised of the rear-wheel tube 11 and the main-frame tube 12 to save the tube material, so as to lower the cost and reduce the weight.

To facilitate users to adjust the distance between the seat cushion 6 and the pedal tube 41 in order to fit different users' personal requirements and achieve the personalized design, a connecting tube element is provided for fixing and coupling the front connecting tube 3 with the swing module, and the connecting tube element is formed by connecting one or more connecting tubes 2, and a plug mechanism is provided for connecting the connecting tube 2 with the main-frame tube 12, for connecting a plurality of connecting tubes 2 and for connecting the connecting tube 2 with the front connecting tube 3. The plug mechanism includes a tube having a plug hole 21 and another tube capable of inserting into the plug hole 21 and fixing by a screw 22 having a plug end, and the plug mechanism further includes two grooves or two ribs formed on the two tubes respectively for preventing the tubes from rotating.

In FIGS. 1 and 2, an end of the front connecting tube 3 is coupled to the connecting tube element, and a corresponding end of the front connecting tube 3 is combined with and coupled to the swing module. Specifically, the swing module includes a pedal tube 41, an end fixed to the middle of the pedal tube 41, and a swing tube 42 with a guide wheel 43 installed at the other end of the swing module, wherein the swing tube 42 is an arc tube with an upper end fixed to the pedal tube 41, and a C-shaped fixed element 31 is installed at an end of the front connecting tube 3, and the swing tube 42 has a bearing sleeve 44 movably contained in a groove of the fixed element 31, and the bearing sleeve 44 is rotably fixed into the groove of the fixed element 31 through the bearing 46 and the fixing shaft 32 which are installed with an interval apart from each other, and both ends of the pedal tube 41 have a flat surface 411 are covered with an anti-slip cover 45 separately.

During use, a rider sits on the seat cushion 6, steps on the pedal tubes 41 by both legs, holds the armrests 61 of the seat cushion 6 by both hands, and pedals the pedal tube 41, while driving the main frame module to swing sideway, so as to move the shilly-car forward. Since the armrests 61 are fixed onto both sides of the seat cushion 6, therefore the rider's body does not have to lean forward. In other words, the rider can hold the armrests 61 by hands conveniently and control the center of gravity more easily. The shilly-car complies with the ergonomic design, and thus the rider can feel free to swing and move the shilly-car forward. The rider's hands will not be hit by obstacles and the invention can provide a safe application.

Figure 3:
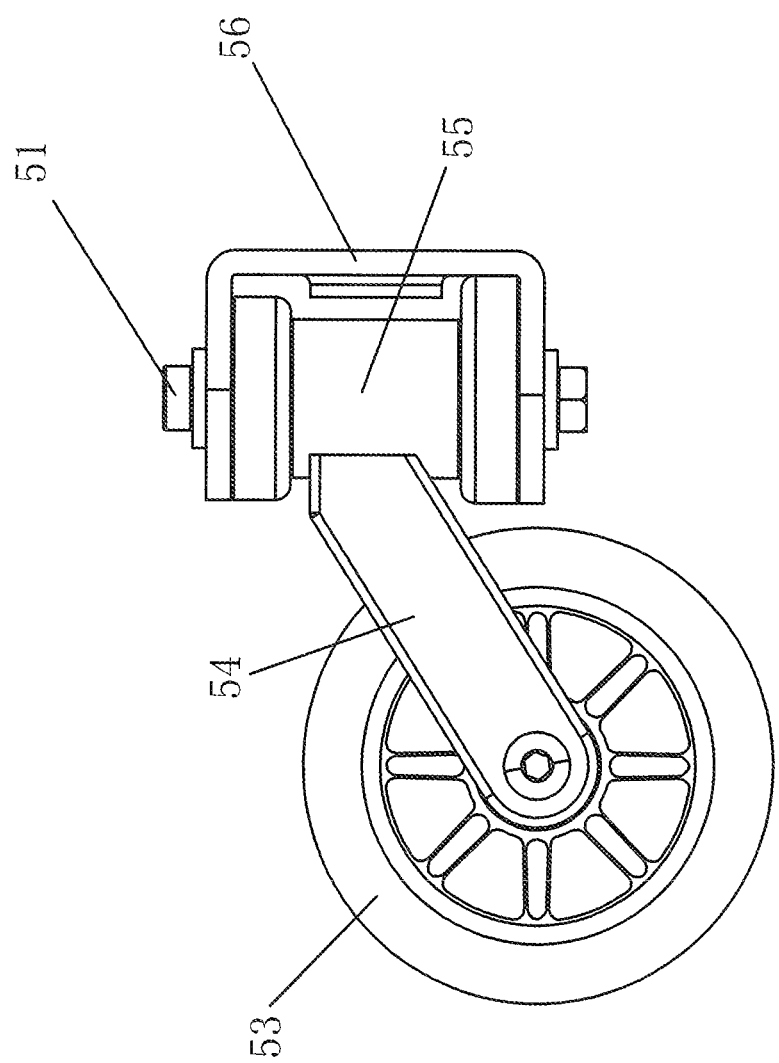
FIG. 3 is a schematic view of a moving wheel with a position restoring function in accordance with the present invention.
Figure 4:
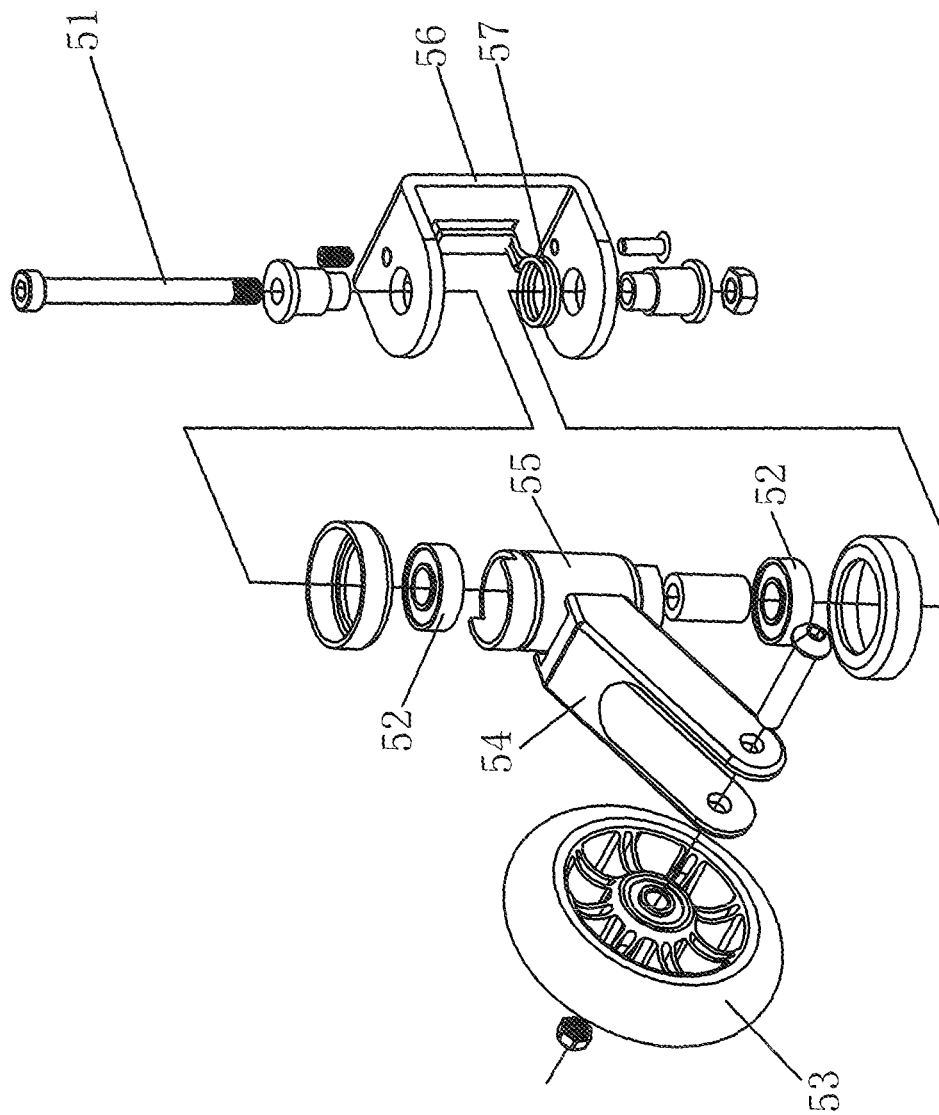
FIG. 4 is an exploded view of a moving wheel with a restoring function in accordance with the present invention.

In FIGS. 3 and 4, the moving wheel 53 includes a movement restoring mechanism having a C-shaped fixed base 56 fixed to an end of the rear-wheel tube 11, a rotating tube 55 rotably fixed into a groove on the fixed base 56 through the positioning shaft 51 and the bearing 52, and a swing arm 54 with an end fixed to a side of the rotating tube 55, and the other end installed with the moving wheel 53, and the positioning shaft 51 is further sheathed with a torsion spring 57 capable of driving the rotating tube 55 to restore its original position. The movement restoring mechanism can overcome the issues of having a turn with a too-large radius or an expected turning or shifting after making a turn. Therefore, the torsion spring 57 can drive the rotating tube 55 to restore its original position, after a turn is made, and the moving wheel 53 is driven to move linearly to improve the rider's safety.

In FIGS. 1 and 2, a brake mechanism is installed between the seat cushion 6 and the main frame module, and the brake mechanism includes a brake handle 83 installed at an armrest 61 of the seat cushion 6, a brake pad 81 provided for braking, and a brake wire 82 coupled to the brake handle 83 and the brake pad 81. The brake pad 81 is a concealed brake pad capable of improving the braking capability for driving and making a turn as well as preventing pinching the rider's hands or fingers. Wherein, the swing arm 54 has an installing block disposed at a position proximate to a surface of the moving wheel, and the brake pad 81 is installed between the swing plate 54 and a surface of the moving wheel through a long shaft, and the brake pad 81 can be turned back and forth within a certain level around the long shaft, and the brake wire 82 is passed through the installing block and coupled to an upper end of the brake pad 81, and a spring is installed between the upper end of the brake pad 81 and the installing block. When the brake handle 82 is not pressed, the brake pad 81 remains not in contact with the moving wheel. When the brake handle is pressed, the brake handle 83 pulls the brake wire 82, so that a lower end of the brake pad 81 is in contact with the moving wheel to brake the wheel. The brake mechanism is installed on the right side of the seat cushion 6 and the main frame module.

In summation of the description above, the present invention improves over the prior art, and is thus duly filed for patent application. While the invention has been described by means of specific embodiments, numerous modifications and variations could be made thereto by those skilled in the art without departing from the scope and spirit of the invention set forth in the claims.

What is claimed is:

1. A shilly-car, comprising a main frame module, a front connecting tube, and a swing module sequentially coupled to one another, characterized in that:

the main frame module includes a rear-wheel tube and has an end of a main frame tube fixed to a middle of the rear-wheel tube, and the rear-wheel tube and the main-frame tube form a T-shaped structure installed with a seat cushion, and two moving wheels are installed at both ends of the rear-wheel tube respectively, wherein the seat cushion includes a T-shaped installing groove corresponding to the T-shaped structure on the main frame module;

the swing module includes a pedal tube and a swing tube, and an end of the swing tube is fixed to the middle of the pedal tube and the other end of the swing tube is installed with a guide wheel, and the swing tube has a bearing sleeve and a bearing installed separately at both ends of the bearing sleeve; and the front connecting tube has an end rotably fixed to the swing tube and the other end fixed and coupled to a corresponding end of the main-frame tube, and an end of the front connecting tube has a C-shaped fixed element for containing the bearing sleeve and the bearings at both ends of the bearing sleeve, and further has a fixing shaft capable of rotably fixing the bearing sleeve and the bearings at both ends of the bearing sleeve into the fixed element.

2. The shilly-car of claim 1, further comprising a movement restoring mechanism installed between the rear-wheel tube and each moving wheel, and the movement restoring mechanism including a C-shaped fixed base, a torsion spring, a rotating tube and a swing arm with an end fixed to a side of the rotating tube, and the fixed base being coupled and fixed to both ends of the rear-wheel tube, and the other end of the swing arm being coupled to each moving wheel, and both ends of the rotating tube having a bearing, and having a positioning shaft for rotably fixing the rotating tube and the bearings at both ends of the rotating tube into the fixed base, and the torsion spring is passed and installed to the positioning shaft to drive the rotating tube to restore its original position.

3. The shilly-car of claim 1, wherein the seat cushion includes two armrests with one armrest being installed on one external side of the seat cushion and the other armrest being separately installed on another external side of the seat cushion.

4. The shilly-car of claim 3, further comprising a brake mechanism having a brake handle, a brake pad and a brake wire coupled to the brake handle and the brake pad, and the brake handle is disposed under one of the armrests, and the brake pad is relatively proximate to one of the moving wheels.

5. The shilly-car of claim 1, wherein the front connecting tube and the swing module are fixed and coupled to each other through a connecting tube element, and the connecting tube element is comprised of one or more connecting tubes, and the connecting tube element and the main-frame tube are fixed and coupled to each other, a plurality of connecting tubes are coupled to each other, and the connecting tube element and the front connecting tube are coupled to each other through a plug mechanism.

6. The shilly-car of claim 5, wherein the plug mechanism includes a plurality of plug holes and screws plugged into the plug holes.

7. The shilly-car of claim 1, wherein the swing tube is an arc tube having an upper end fixed to the pedal tube.

8. The shilly-car of claim 1, wherein the pedal tube has a flat surface disposed separately at both ends of the pedal tube and sheathed with an anti-slip cover.

9. The shilly-car of claim 1, further comprising a backrest cushion installed on a side of the seat cushion.

10. The shilly-car of claim 9, wherein the seat cushion and the backrest cushion are integrally formed.

* * * * *